United States Patent

Ueda

[11] Patent Number: 5,863,475
[45] Date of Patent: Jan. 26, 1999

[54] CONTROL METHOD OF AN INJECTION MOLDING MACHINE

[75] Inventor: Masahiko Ueda, Aichi-ken, Japan

[73] Assignee: Kabushiki Kaisha Meiki Seisakusho, Aichi, Japan

[21] Appl. No.: 903,094

[22] Filed: Jul. 30, 1997

[30] Foreign Application Priority Data

Sep. 27, 1996 [JP] Japan .................................. 8-277590

[51] Int. Cl.$^6$ .................................................. B29C 45/80
[52] U.S. Cl. ...................... 264/40.5; 264/328.1; 425/150; 425/590
[58] Field of Search ................................. 264/40.1, 40.5, 264/328.1; 425/150, 589, 590, 595, 450.1, 451.2, 451.9

[56] References Cited

U.S. PATENT DOCUMENTS

| | | | |
|---|---|---|---|
| 4,592,713 | 6/1986 | Gutjahr | 264/40.5 |
| 4,592,714 | 6/1986 | Gutjahr | 264/40.5 |
| 4,781,872 | 11/1988 | Inaba | 264/40.5 |
| 4,802,834 | 2/1989 | Neko | 264/40.5 |
| 5,238,383 | 8/1993 | Bannai | 264/40.5 |
| 5,493,503 | 2/1996 | Richards et al. | 264/40.5 |
| 5,514,311 | 5/1996 | Shimizu et al. | 264/40.5 |
| 5,529,478 | 6/1996 | Siegrist et al. | 425/150 |

FOREIGN PATENT DOCUMENTS

| | | |
|---|---|---|
| 3032407 | 4/1982 | Germany . |
| 1171828 | 6/1989 | Japan . |
| 6190884 | 12/1994 | Japan . |

*Primary Examiner*—Jill L. Heitbrink
*Attorney, Agent, or Firm*—Browdy and Neimark

[57] ABSTRACT

A control method for an injection molding machine includes deciding a position where the speed of a movable platen is to be changed from high speed to low speed. Over the coasting distance, between high speed (equivalent to $V_4$) and low speed (equivalent to $V_6$), the speed changes smoothly past the decided position in accordance with a function of time, $F(T)=V_4-(V_4-V_6)(1-e^{-T})$. Decreasing speed at a second decided position, just before the movable platen stops, is in accordance with a function of position s, $F(s)= s(V_{MAX}-V_{MIN})/D+V_{MIN}$. $V_{MAX}$ is equivalent to the maximum mold closing or opening speed and $V_{MIN}$ is equivalent to the minimum speed at which moving of the movable platen is guaranteed.

8 Claims, 2 Drawing Sheets

CONTROL METHOD OF AN INJECTION MOLDING MACHINE

FIELD OF THE INVENTION

The present invention relates to a method of controlling the speed of mold closing and opening in injection molding machines, and more particularly relates to a control method for changing the speed of a movable platen.

DESCRIPTION OF RELATED TECHNOLOGY

In the prior arts, conventionally, when opening or closing the mold in an injection molding machine driven by hydraulic pumps, a movable platen, to change its speed, has been operated by hydraulic oil delivered into a clamping cylinder controlled by signals generated from a position sensor detecting that the movable platen has reached a predetermined position. Generally, two ways of changing its speed from high to low have been used. In one way the speed is changed swiftly and in the other the speed is changed gradually.

Speed control, for closing and opening the mold, has been implemented in relation to predetermined positions. However, it is difficult to change speed at a desired position without fluctuation of the position.

First, when the balance between high speed and low speed of the movable platen is modified in accordance with the molding condition of articles to be molded, modification of the speed changeover position is also required. But when changing the mold closing and opening speed, the inertia of a mold movable section (including a movable platen, a moldhalf and a ram) varies in proportion to the mass of the movable mold section and/or of the speed balance between high speed and low speed of the movable platen. The larger the inertia is, the longer the braking distance that is required. Therefore, for protecting the mold from collision shock, it may be preferable for a movable mold section with large inertia to run at a low speed in a longer distance. However, elongating low-speed distance causes the molding cycle to be prolonged, resulting in decreasing the productivity of the injection molding process.

Second, when mold closing or opening speed rapidly changes from a high speed to a low speed by decreasing the pump's delivery of hydraulic oil, the movable platen 14 coasts for a while at high speed due to inertia. However, the amount of hydraulic oil delivered from the pump is insufficient to create vacuum in the clamping cylinder, resulting in intermittent motion with stopping of the movable platen.

The position $S_c$ at which changeover from a high speed to a low speed occurs (shown in FIG. 2) is very significant for closing the mold without moldhalf collision. Even if the appropriate changeover position $S_c$ is decided, it is difficult to change the speed of the movable platen at the position $S_c$ into a low speed without fluctuation of the position as mentioned above.

Consequently, in the customary method, a practical speed changeover position has preceded by a good distance the required changeover position $S_c$ in consideration of fluctuation of the changeover position.

These phenomena occur in mold closing as well as mold opening. Fluctuation in opening the mold causes problems with robot chucking of molded articles.

SUMMARY OF THE INVENTION

In light of the above-mentioned problems, it is an object of the present invention to provide a novel control of an injection molding machine movable platen by which the mold is to be closed without damaging the mold and opened without the fluctuation of a mold opening position in a short cycle time.

It is another object of the present invention to provide a novel control method of an injection molding machine by which running the speed of a movable platen is changed from a high speed to a low speed at the predetermined position without fluctuation of the position, in order to curtail its running time at a low speed.

It is another object of the present invention to provide a novel control method for an injection molding machine by which a movable platen running speed is decreased from a high speed to a low speed in accordance with a predetermined curve of speed versus the position of the movable platen, aiming at a changeover position from a high speed to a low speed.

It is another object of the present invention to provide a novel control method for a movable platen of an injection molding machine which enables low speed to be maintained at a speed more than a minimum speed, to guarantee smooth movement of the movable platen without stopping or chattering (intermittent motion), and which enables the maintained low speed to be decreased rapidly at a position slightly preceding the mold closing or opening end position.

For a better understanding of the operation, objects and advantages of the invention, reference should be had to the accompanying drawing and descriptive matter in which there is illustrated and described a preferred embodiment of the invention.

BRIEF DESCRIPTION OF THE DRAWING FIGURES

The above and other objects and the nature and advantages of the present invention will become more apparent from the following detailed description of an embodiments taken in conjunction with drawings, wherein.

DETAILED DESCRIPTION OF THE PREFERRED EMBODIMENT

This invention will be described in further detail by way of example with reference to the accompanying drawings.

Figure 1:
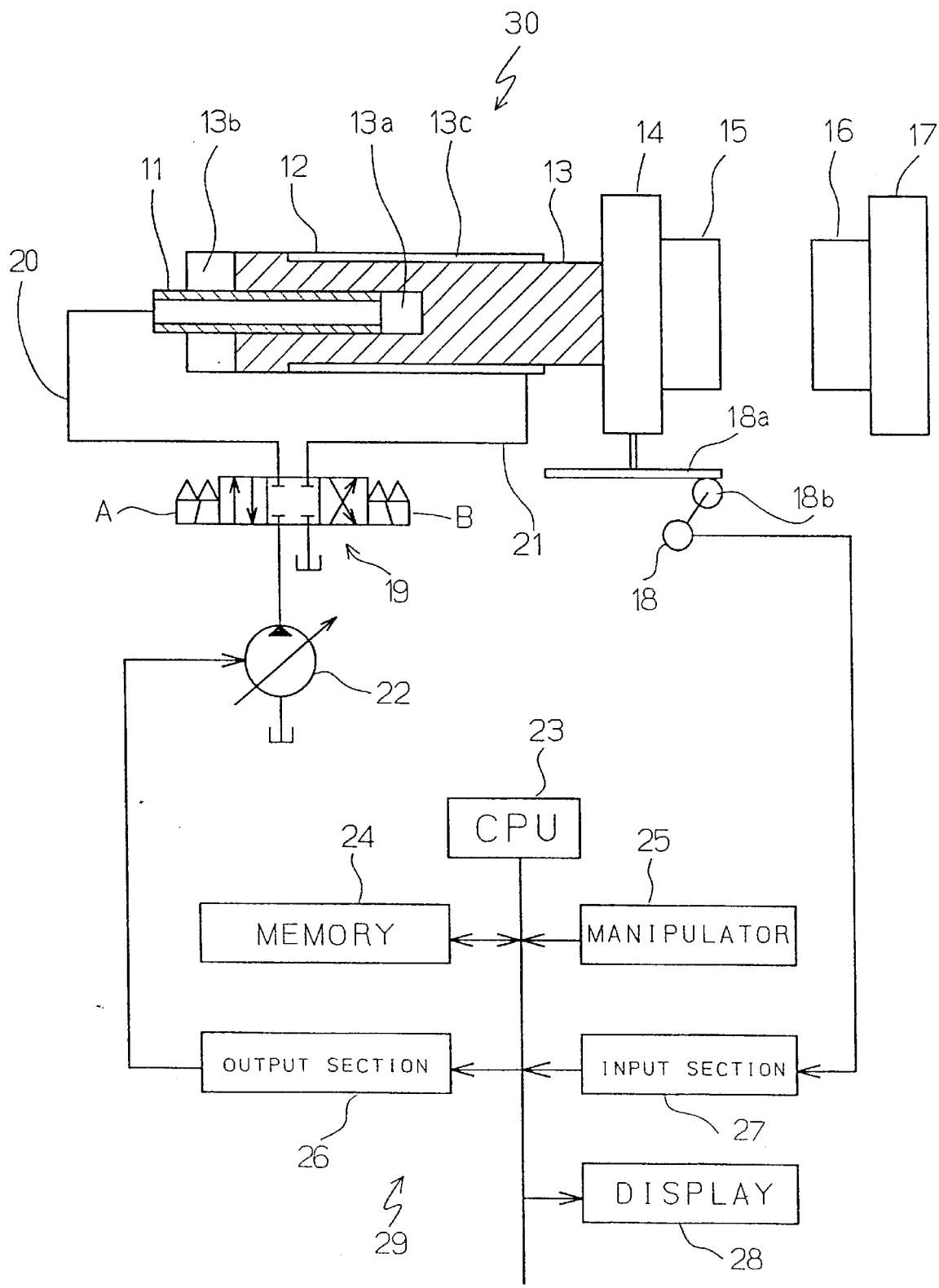
FIG. 1 is an elevational and partly cross sectional view of a mold clamping apparatus of an injection molding machine including a partial hydraulic circuit and a block diagram of an electric control circuit.

In FIG. 1, a mold clamping apparatus 30 includes a mold clamping cylinder 12 in which a ram 13 with a booster ram 11 reciprocates. The booster ram 11 is fixed in the mold clamping cylinder 12 and is inserted into a booster chamber 13a of the ram 13 so that the ram 13 is capable of moving at high speed. A movable platen 14 is fixed to an end portion of the ram 13. A movable moldhalf 15 and a stationary moldhalf 16 are mounted on the movable platen 14 and a stationary platen 17 is fixed to a machine base (not shown) respectively. A position sensor 18 embodied as an encoder or a potentiometer which detects the displacement of the movable platen 14, is coupled to the movable platen 14. FIG. 1 shows a pinion 18b fixed to the encoder 18 and a rack 18a fixed to the movable platen 14, is geared with the pinion 18b.

Hydraulic oil is delivered from the variable delivery pump 22 into the booster chamber 13a and/or cylinder chamber 13b (the piping for delivering the oil into the chamber 13b is not shown in FIG. 1) through a three-position, four-way directional valve 19 energized by a solenoid A to close the mold. Energizing solenoid B causes hydraulic oil to be delivered through a pipe 21 into a cylinder chamber 13c to open the mold. The variable delivery pump 22 can be replaced by a fixed delivery pump and a flow-control valve.

The variable delivery pump 22 and the directional valve 19 are operated by command signals from an electrical control device 29 including a CPU 23 of a microprocessor, a memory 24 with RAM and ROM, a manipulator or manual input 25 with a ten-key board for inputting data values and changeover switches, an output section 26 for outputting command signals to the variable delivery pump 22 and the directional valve 19, an input section 27 for inputting signals from the position sensor 18 and limit switches (not shown) and a display 28 for displaying set values and actual values of molding conditions.

Figure 2:
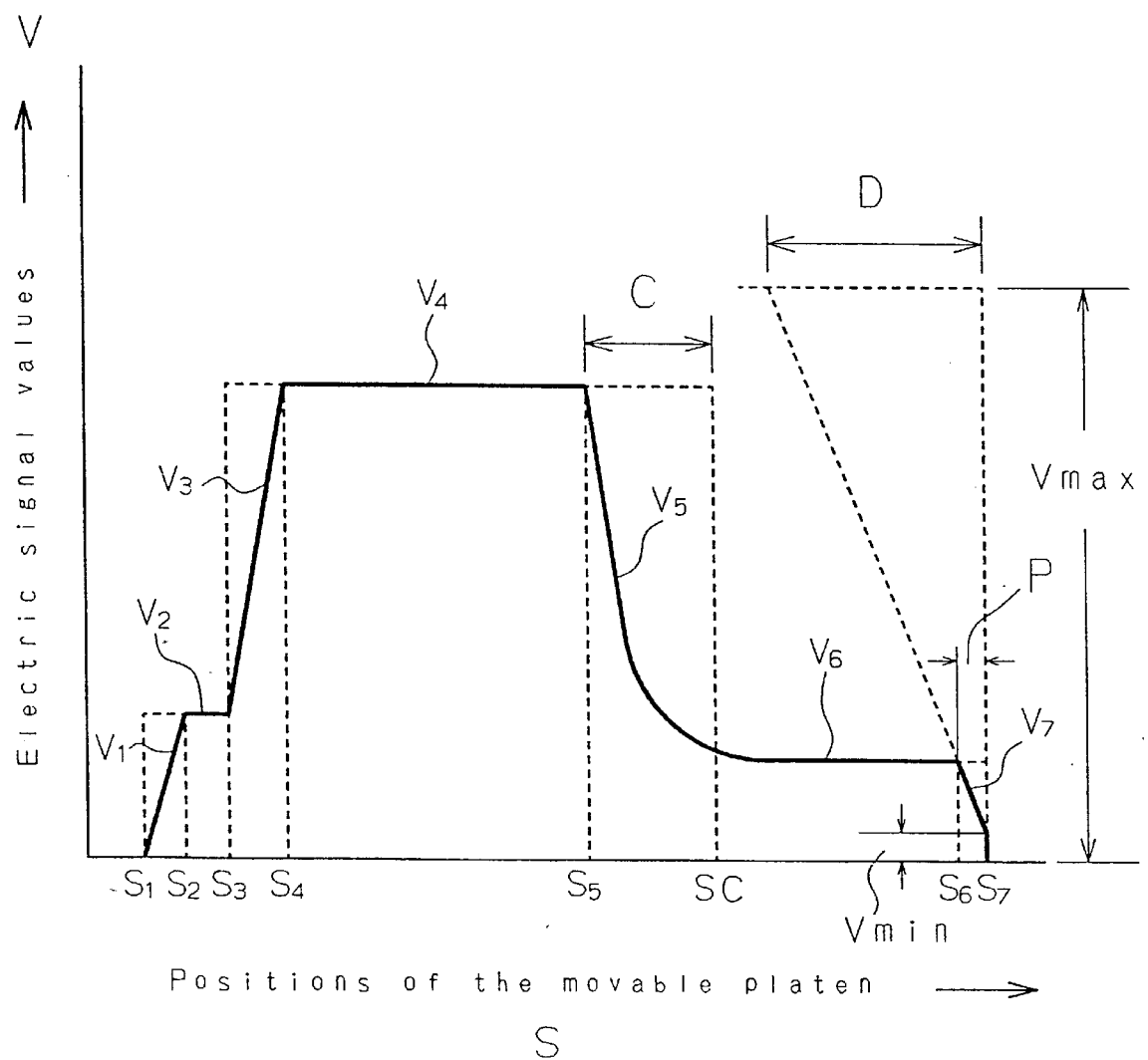
FIG. 2 is a graph of the control signal values of mold opening and closing speed versus the positions of the movable platen.

FIG. 2 shows the operation of mold opening and closing. The relation of electric signal values V for changing the speed of the movable platen 14 versus the positions S of the movable platen 14 during mold closing or opening is illustrated.

When the solenoid A of the directional valve 19 is energized, the movable platen 14 advances according to the amount of hydraulic oil delivered into the booster chamber 13a from the pump 22. The pump 22 drive is controlled by predetermined electric signals $V_1$, $V_2$, and $V_3$ in the intervals between the positions $S_1$, $S_2$, $S_3$ and $S_4$ as shown in FIG. 2. After the movable platen 14 has reached the position $S_4$, the electric signal value is maintained at predetermined signal value $V_4$ to advance the movable platen 14 at high speed.

When closing or opening the mold, speed changeover of the movable platen 14 is required at predetermined positions without fluctuation of the positions. The position $S_c$ corresponds to the instant when $V_4$ changes over to $V_5$. When the signal value drops the movable platen 14 begins to decelerate. The desirable location of position $S_c$ is predetermined by the inertia of the movable section, which coasts after the signal values is reduced from $V_4$ to $V_5$. Then operation of CPU 23° is commenced for finding a position $S_5$ at which to change the electric signal value $V_4$ into the electric signal value $V_6$ for causing a low speed.

The position $S_5$ is calculated by the following operation of CPU 23. Constant A is calculated based on the distance by which the mold movable section, including the movable platen 14, a moldhalf and the ram 13, coasts due to inertia when changing from the maximum high speed of mold closing or opening. The constant A is proportional to the mass of the clamping apparatus of the injection molding machine. The constant B is used when a slight adjusting of the distance C is required, and its value is input into RAM by manipulating the ten keys of manipulator 25. Values of V4, V6, A, B and Sc are stored in the memory 24 using the ten keys. CPU 23 calculates distance C from a given equation to obtain the position, that is, $S_5=S_c-C$ where $$C=A(V_4-\bar{V}_6)+B.$$

The value $S_5$ is stored into the memory 24. CPU 23 calculates the signal value $V_5$ for decreasing the speed of the movable platen 14 gradually and rapidly from a given equation, $$V_5=F(T)=V_4-(V_4-V_6)(1-e^{-T}),$$

where $T=t/C_R$, $C_R$ refers to a time constant, and t refers to elapsed time after the movable platen 14 reaches the position $S_5$. The time constant $C_R$ is stored in the memory 24, but can be changed to be proportional to the injection molding machine clamping apparatus' weight.

The position sensor 18 having detected that the movable platen 14 has reached the position $S_5$, the CPU commands the output signal $V_5$ to the pump 22 based on the exponential function F(T). As time (t) elapses, the time (t) becomes considerably larger than the value of $C_R$. Therefore the signal value $V_5$ becomes nearly equal to $\bar{V}_6$ with a value $e^{-T}$ approaching infinitely close to zero, causing the closing speed of the movable platen 14 to be changed into a predetermined low speed (corresponding to signal $V_6$).

Values of $C_R$ differ according to the particular model of injection molding machine. For instance, the $C_R$ of an injection molding machine with 150 tons clamping force is 50 milliseconds (1/1000 second) on mold closing and 150 milliseconds on mold opening. In actual molding, when a value of $t/C_R$ reaches nearly more than three, the speed $V_5$ of the movable platen may be regarded as a low speed (equivalent to $\bar{V}_6$) and the value of $e^{-T}$ counted as nearly zero.

The movable platen 14 advances at a low speed (corresponding to the signal $\bar{V}_6$) and when the mold approaches to a mold closing or opening end position $S_7$, the CPU 23 calculates the position $S_6$ at which the higher mold closing or opening speed equivalent to $V_6$ should be changed to a minimum low speed (corresponding to $V_{MIN}$) and the speed commences to be rapidly decreased.

The position $S_6$ is obtained from a distance P, shown in FIG. 2, which is calculated by a formula $P=D(V_6-V_{MIN})/(V_{MAX}-V_{MIN})$. D is a constant corresponding to a distance the movable platen coasts when stopping from maximum high speed (equivalent to $V_{MAX}$).

$V_{MAX}$ is a signal value equivalent to the maximum mold closing or opening speed.

$V_{MIN}$ is a signal value equivalent to the minimum speed at which smooth movement of the movable platen 14 is guaranteed without resting or intermittent movement (chattering, jerking, or stopping).

The values of D, $V_{MIN}$ and $V_{MAX}$ are stored in the memory 24.

When the position sensor 18 detects that the movable platen 14 has reached the position $S_6$, CPU 23 outputs signal value $V_7$, a function F (s), to the pump 22, according to $$V_7=F(s)=s(V_{MAX}-V_{MIN})/D+V_{MIN}$$

where s is variable factor of actual distance over which the movable platen 14 moves between $S_6$ and $S_9$.

The movable platen 14 advances with its speed decreasing but with its minimum speed maintained so that smooth motion can be guaranteed and the mold can be closed without collision.

Above description, mainly regarding mold closing operation, can be applied equally to mold opening operation in the invention.

As mentioned above, the present invention includes a novel control method of an injection molding machine capable of changing the mold closing or opening speed from a high speed to a low speed at a predetermined position due to driving the variable delivery pump in accordance with a command signal due to an exponential function without fluctuation of the changeover position. The invention curtails the distance where the mold runs at low speed and avoids damaging the mold due to collision, resulting in curtailing the cycle time of mold closing and opening.

Moreover, the present invention includes a novel control method of an injection molding machine capable of maintaining the movable platen 14 at a low speed, greater than a minimum speed, to guarantee smooth movement of the movable platen, resulting in curtailing molding cycle time without collision of the mold, in addition to the above-mentioned decreasing method with command signals based on an exponential function.

For a practical example, when during mold closing the decreased command signal value for driving the variable delivery pump decreased from 100% to 6% (in an injection molding machine with 150 Tons clamping force), the position $S_c$ fluctuated in a range of 55 millimeters by a customary method but by the present invention fluctuated only in the range of 12 millimeters.

When during mold opening the command signal value for driving the variable delivery pump decreased from 100% to 12%, the position $S_c$, fluctuated in the range of 90 millimeters by a customary (i.e. conventional) method but in the present invention fluctuates only in the range of 13 millimeters.

Moreover, a mold opening end position $S_7$ which fluctuated in the range of 0.4 millimeters by a customary method can stay in the range of 0.1 millimeter by the present invention. This improvement prevents failures when robots remove molded articles.

The foregoing description of the specific embodiments will so fully reveal the general nature of the invention that others can, by applying current knowledge, readily modify and/or adapt for various applications such embodiments without undue experimentation and without departing from the generic concept, and, therefore, such adaptations and modifications should be and are intended to be comprehended within the meaning and range of equivalents of the disclosed embodiments. The means and materials for carrying out various disclosed function may take a variety of alternative forms without the invention. It is to be understood that the phraseology or terminology employed herein is for the purpose of description and not of limitation.

What is claimed is:

1. A control method for an injection molding machine of the type having: an actuator for advancing or retreating a movable platen with a mold to a stationary platen with a mold; a CPU including a memory, an output section, an input section, a manual input, and a display; and a position sensor for detecting positions of the movable platen; the method comprising:

driving the actuator to close or open the mold according to a command signal from the CPU, further comprising the steps of sequentially;

increasing the command signal to a predetermined first value $V_4$ until the movable platen reaches a predetermined first position $S_4$;

maintaining the command signal first value $V_4$;

calculating, via CPU operation, a second position $S_5$ of the movable platen at which decreasing the command signal from the first value $V_4$ is to be commenced so as to slow the movable platen from a high speed at the second position $S_5$ to a low speed at an optimum, third position $S_c$;

calculating a decreasing command signal value $V_5$ between the second position $S_5$ and the third position $S_c$, the decreasing command signal value $V_5$ corresponding to an exponential function changing the command signal to a predetermined value $V_6$ at the third position $S_c$.

2. The control method according to claim 1, including initially predetermining the third position $S_c$ such that the mold closes or opens fully without collision and without intermittent motion.

3. The control method according to claim 1, wherein the low speed is faster than a minimum guaranteed low speed of the movable platen, and further comprising the steps of:

calculating, via CPU operation, a fourth position $S_6$ at which further decreasing the command signal is to be commenced in order to stop the movable platen from the low speed;

further decreasing the command signal in accordance with a calculated command signal $V_7$ after the movable platen reaches a fourth position $S_6$.

4. The control method according to claim 3, including:

calculating, via CPU operation, the fourth position according to a formula $S_6=(S_7-P)$, where $S_7$ is a final position and $P=D$ $(V_6-V_{MIN})/(V_{MAX}-V_{MIN})$, and D is a constant corresponding to a distance over which the movable platen coasts when stopping from maximum high speed, $V_{MAX}$ is a signal value of the maximum mold closing speed, $V_{MIN}$ is a signal value of the minimum speed;

calculating the signal $V_7$ via CPU operation according to an equation $$V_7=s(V_{MAX}-V_{MIN})/D+V_{MIN}$$

where s is a variable factor of actual distance over which the movable platen 14 moves between the fourth position $S_6$ and the final position $S_7$, and over which driving the actuator corresponds to the signal $V_7$.

5. The control method according to claim 1, wherein the step of calculating the position $S_5$ includes calculating according to a formula $S_c—C$, where $C=A$ $(V_4-V_6)+B$, A is a first constant proportional to a magnitude of a weight of an injection molding machine clamping apparatus and B is a second constant slightly modifying the value of C, and wherein the exponential function corresponding to the decreasing command signal value $V_5$ further comprises an equation $$V_5=F(T)=V_4-(V_4-V_6)(1-e^{-T}),$$

where $T=t/C^R$, wherein t is an elapsed time and $C_R$ is a time constant which varies in proportion to the magnitude of the weight of the injection molding machine clamping apparatus.

6. A control method for an injection molding machine of the type having: an actuator for advancing or retreating a movable platen with a mold to a stationary platen with a mold; a CPU including a memory, an output section, an input section, a manual input, and a display; and a position sensor for detecting positions of the movable platen; the method comprising:

driving the actuator to close or open the mold according to a command signal from the CPU, further comprising the steps of sequentially;

increasing the command signal to a predetermined first value $V_4$ until the movable platen reaches a predetermined first position $S_4$;

calculating, via CPU operation, a second position $S_5$ of the movable platen at which decreasing the command signal from the first value $V_4$ is to be commenced so as to slow the movable platen from a high speed at the second position $S_5$ to a low speed at an optimum, third position $S_c$;

calculating, via CPU operation, a fourth position $S_6$ at which further decreasing the command signal is to be commenced in order to stop the movable platen from the low speed beyond the fourth position $S_6$; and further decreasing the command signal in accordance with a calculated command signal $V_7$ after the movable platen reaches the fourth position $S_6$.

7. The control method according to claim 6, wherein the step of calculating the position $S_5$ includes calculating according to a formula $S_c$—C, where C=A $(V_4-V_6)$+B, A is a first constant proportional to a magnitude of a weight of an injection molding machine clamping apparatus and B is a second constant slightly modifying the value of C, and wherein the exponential function corresponding to the decreasing command signal value $V_5$ further comprises an equation $$V_5 = F(T) = V_4 - (V_4 - V_6)(1 - e^{-T}),$$

where $T = t/C^R$, wherein t is an elapsed time and $C_R$ is a time constant which varies in proportion to the magnitude of the weight of the injection molding machine clamping apparatus.

8. The control method according to claim 6, including:

calculating, via CPU operation, the fourth position according to a formula $S_6=(S_7-P)$, where $S_7$ is a final position and P=D $(V_6-V_{MIN})/(V_{MAX}-V_{MIN})$, and D is a constant corresponding to a distance over which the movable platen coasts when stopping from maximum high speed, $V_{MAX}$ is a signal value of the maximum mold closing speed, and $V_{MIN}$ is a signal value of the minimum speed;

calculating, via CPU operation, a signal $V_7$ according to an equation;

$$V_7 = s(V_{MAX}-V_{MIN})/D + V_{MIN}$$

where s is a variable factor of actual distance over which the movable platen 14 moves between $S_6$ and $S_7$, and over which driving the actuator corresponds to the signal $V_7$.

* * * * *